US011831652B2

(12) United States Patent
Tanutama et al.

(10) Patent No.: US 11,831,652 B2
(45) Date of Patent: Nov. 28, 2023

(54) APPARATUSES, METHODS, AND COMPUTER PROGRAM PRODUCTS FOR SERVICE PERMISSIONS SCALING IN A FEDERATED SYSTEM

(71) Applicants: ATLASSIAN PTY LTD., Sydney (AU); ATLASSIAN US, INC., San Francisco, CA (US)

(72) Inventors: Mikhael Harswanto Tanutama, Fremont, CA (US); Vishal Pandey, Pflugerville, TX (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 74 days.

(21) Appl. No.: 17/351,806

(22) Filed: Jun. 18, 2021

(65) Prior Publication Data

US 2022/0407866 A1 Dec. 22, 2022

(51) Int. Cl.
*G06F 7/04* (2006.01)
*G06F 15/16* (2006.01)
*H04L 29/06* (2006.01)
*H04L 9/40* (2022.01)

(52) U.S. Cl.
CPC .................. *H04L 63/108* (2013.01)

(58) Field of Classification Search
CPC .................................................... H04L 63/108
USPC ............................................................. 726/4
See application file for complete search history.

(56) References Cited

U.S. PATENT DOCUMENTS 10,812,482 B1 * 10/2020 Xu ..................... G06F 21/604
2020/0084036 A1 * 3/2020 Rowe .................... H04L 9/3213

* cited by examiner

*Primary Examiner* — Jeffrey C Pwu
*Assistant Examiner* — Samuel Ambaye
(74) *Attorney, Agent, or Firm* — Alston & Bird LLP

(57) ABSTRACT

Methods, apparatuses, or computer program products according to the present disclosure provide for service permissions scaling. In example embodiments, an apparatus receives a service request from an edge server. The apparatus may generate an authorization token based at least in part on a permissions data vector, where the authorization token is configured for access by one or more computing devices to determine whether to grant access by a first computing device associated with the requesting entity identifier to one or more resources associated with the one or more computing devices. The apparatus may then transmit the authorization token to the edge server. According to some embodiments, the authorization token may be configured for storing in an authorization token cache. In some embodiments, the authorization token may be retrieved from the authorization token cache.

28 Claims, 11 Drawing Sheets

APPARATUSES, METHODS, AND COMPUTER PROGRAM PRODUCTS FOR SERVICE PERMISSIONS SCALING IN A FEDERATED SYSTEM

BACKGROUND

Management of user authentication and authorization in a system employing several services is technologically complex and fraught with failures. Applicant has identified many deficiencies and problems associated with user authentication and authorization in such systems. Through applied effort, ingenuity, and innovation, these identified deficiencies and problems have been solved by developing solutions that are configured in accordance with the embodiments of the present disclosure, many examples of which are described in detail herein.

BRIEF SUMMARY

Embodiments of the present disclosure relate to apparatuses, methods, and computer program products for service permissions scaling in a federated system. In example embodiments, an apparatus for service permissions scaling in a federated system includes at least one processor and at least one memory including program code that, with the processor, cause the apparatus to: receive, from an edge server, a service request. In embodiments, the service request comprises a requesting entity identifier and a first context identifier associated with a first service identifier of a plurality of service identifiers. The apparatus is further caused to generate an authorization token based at least in part on a permissions data vector associated with the requesting entity identifier. In embodiments, the permissions data vector comprises a plurality of permissions data records. In embodiments, each permissions data record of the plurality of permissions data records comprises a permissions data value associated with a unique service identifier of the plurality of service identifiers and a context data value associated with a unique context identifier of a plurality of context identifiers. In embodiments, a first permissions data record comprises the first context identifier and the first service identifier In embodiments, the authorization token is configured for access by one or more computing devices associated with one or more of the plurality of service identifiers to determine whether to grant access by a first computing device associated with the requesting entity identifier to one or more resources associated with the one or more computing devices. In embodiments the apparatus is further caused to transmit the authorization token to the edge server.

In embodiments, the apparatus is further caused to transmit, to a permissions server, a request for the permissions data vector. In embodiments, the apparatus is further caused to receive, from the permissions server, the permissions data vector.

In embodiments, the service request comprises a request to access one or more of a feature or data associated with a resource associated with the first service identifier.

In embodiments, the service request originates from the first computing device associated with the requesting entity identifier.

In embodiments, the first context identifier comprises a resource identifier.

In embodiments, the apparatus is further caused to store the authorization token in an authorization token cache.

In embodiments, the authorization token is configured to expire after a validity expiration period.

In embodiments, the authorization token is configured for invalidation in response to a change in the permissions data vector.

BRIEF DESCRIPTION OF THE SEVERAL VIEW OF THE DRAWINGS

Having described some embodiments in general terms, references will now be made to the accompanying drawings, which are not drawn to scale, wherein.

DETAILED DESCRIPTION OF VARIOUS EMBODIMENTS

Figure 1A:
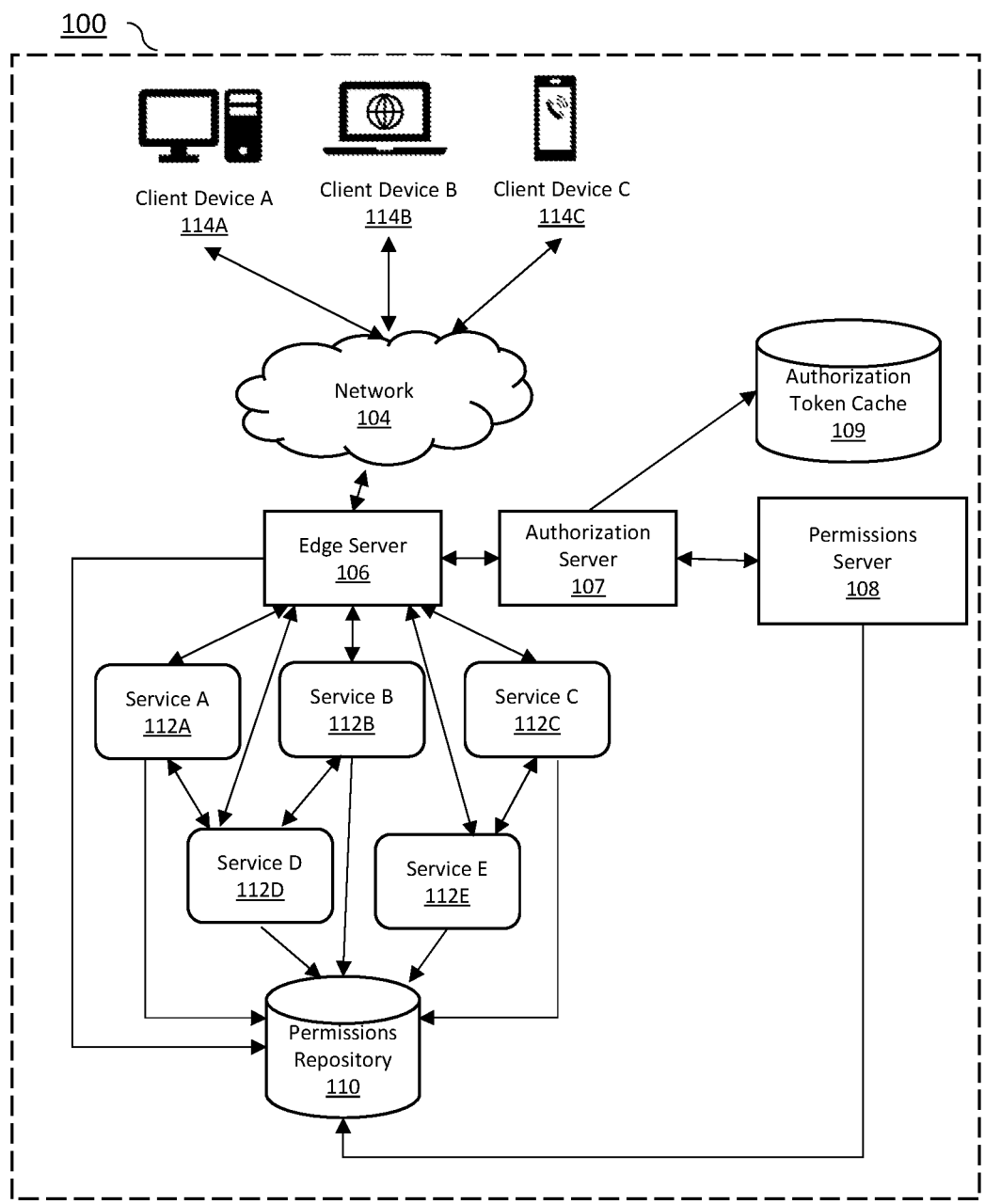
FIG. 1A is a block diagram of an example service permissions scaling system within which at least some embodiments of the present disclosure may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

The deployment of service based computing systems, such as a federated system, may involve tens of thousands or millions of services that may be interdependent. Different users or entities may be associated with differing access rights to data and/or features associated with the different services, and each service may have differing permissions rules. When a requesting entity (e.g., a user, service, microservice, application, component, or the like), for example, makes a request associated with a given service within a federated system, in addition to first authenticating the requesting entity, the service generally must also determine whether the requesting entity has the requisite permissions to access the data and/or features to fulfill the request. This process of confirming a requesting entity's permissions generally involves communications and/or data transfer between the service and at least one other service to retrieve permissions data associated with the requesting entity. Moreover, in many scenarios, a single requesting entity request may be associated with a multitude of services, whereby each of the services must communicate with one or more other services to retrieve permissions data associated with the requesting entity. Furthermore, in many scenarios the data sought by the various services may be the same, but each service must still individually request the data. Accordingly, this results in inefficiency, high network traffic, and high latency within the federated system.

To address the noted shortcomings, various embodiments of the present disclosure are directed to systems that are configured to scale service permissions and reduce latency by efficiently propagating permissions data across multiple services and across multiple requests. In various embodiments, an authorization token comprising all (e.g., or a subset of) permissions data associated with a user or other requesting entity for the given context in the request is generated by an authorization server and transmitted via an edge server to relevant services. In addition, various embodiments of the present disclosure provide for caching of the authorization token to significantly improve the latency and scale of the federated system. In response to a service request, the authorization server may access a cache to retrieve and reuse an authorization token associated with the service request and requesting entity and transmit to the relevant services, rather than generating a new authorization token. The number of network calls are reduced, thus reducing overall latency as more network resources would be available. Moreover, in various embodiments, only the authorization server may access the permissions server (e.g., the permissions data provider), thus providing added security.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The term "federated system" refers to an interconnected system including a number of computing systems that, in conjunction with at least one or more shared systems and/or functionality associated therewith, provide various software services. The federated system may include at least one computing system that performs processing services and/or database storage services that support functionality for multiple computing systems interconnected via the federated system. For example, the federated system may include at least one computing system for managing access to the various services.

The term "requesting entity" refers to user, service, microservice, component, computing device, computing entity, or the like requesting access to data and/or feature associated with a given service.

The term "requesting entity identifier" refers to one or more items of data by which a requesting entity may be uniquely identified within a federated system. For example, a requesting entity identifier may comprise ASCII text, a pointer, an IP address, a MAC address, a memory address, or other unique identifier.

The term "digital content items" or "content" refers to any electronic media content item that is intended to be used in either an electronic form or as printed output and which is retrievable by or otherwise associated with any of the plurality of software applications that are accessible by the federated system. A digital content item, for example, may be in the form of a stored document associated with a collaborative project within a software application. Other digital content items include images, audio files, text files, and the like.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a service made available by a server. The server is often, but not always, on another computer system, in which case the client accesses the service by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "application," "software application," "application software," "app," or similar terms refer to a computer program or group of computer programs designed for use by and interaction with one or more networked or remote computing devices. Examples of an application comprise workflow engines, service desk incident management, team collaboration suites, cloud services, word processors, spreadsheets, accounting applications, web browsers, email clients, media players, file viewers, videogames, and photo/video editors. An application can be supported by one or more services either via direct communication with the service or indirectly by relying on a service that is in turn supported by one or more other services.

The term "service permissions" refers to permissions data associated with a requesting entity identifier representative of whether computing devices associated with the requesting entity identifier may be granted access to one or more resources associated with a service within a federated system. The service permissions may also include permissions data representative of types of access within a given service a requesting entity identifier may be associated with. For example, a given requesting entity identifier may be associated with a particular level of access to a given service, whereby the requesting entity identifier may have been granted access to certain features of the given service but not others. Further, a given requesting entity identifier may be associated with a particular level of data access within a given service, whereby the requesting entity identifier may have been granted access to certain data within the given service but not others. For example, where the requesting entity is a user, permissions data associated with the requesting entity may be defined based on role (e.g., system administrator), group (e.g., project team member), job title within an organization (e.g., senior engineer), the like, or combinations thereof.

The term "edge server" refers to a software platform and associated hardware that serves as a gateway (or intermediary) to one or more services. The edge server may be configured to manage various services within the federated system and provide various functionalities, including receiving requests to access the various services. The edge server may be accessible via one or more computing devices and may be configured to access one or more data repositories. The functionality of the edge server may be provided via a single server or a collection of servers having a common functionality, or the functionality of the edge server may be segmented among a plurality of servers or collection of servers performing subsets of the described functionality of the edge server.

The terms "service," "microservice," and similar terms may refer to a software functionality or a set of software functionalities, such as the retrieval of specified information or the execution of a set of operations, with a purpose that different clients can reuse for their respective purposes, together with the policies that should control its usage, for example, based on the identity of the client (e.g., a user, requesting entity identifier, an application, another service, etc.) requesting the service. Additionally, a service may support, or be supported by, at least one other service via a service dependency relationship. For example, a translation application stored on a smartphone may call a translation dictionary service at a server in order to translate a particular word or phrase between two languages. In such an example the translation application is dependent on the translation dictionary service to perform the translation task. In some embodiments, a service is offered by one computing device over a network to one or more other computing devices. Additionally, the service may be stored, offered, and utilized by a single computing device to local applications stored thereon and in such embodiments a network would not be required. In some embodiments, services may be accessed by other services via a plurality of Application Programming Interfaces (APIs), for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an internal developer tool, web based HTTP services, databased services, and asynchronous message queues which facilitate service-to-service communications. In some embodiments, a service can represent an operation with a specified outcome and can further be a self-contained software program. In some embodiments, a service from the perspective of the client (e.g., another service, application, etc.) can be a black box meaning that the client need not be aware of the service's inner workings.

The term "service identifier" refers to one or more data items or elements by which a service may be uniquely identified. The service identifier may include, for example, one or more of Internet Protocol (IP) addresses associated with a service, Uniform Resource Locators (URLs) associated with a service, numerical characters, alphabetical characters, alphanumeric codes, American Standard Code for Information Interchange (ASCII) characters, encryption keys, identification certificates, the like, or combinations thereof. An example embodiment of a service identifier may comprise data provided by at least a service author, for example, a URL and a payload associated with a service. In some embodiments, the payload comprises a JSON formatted text that is either posted, by way of an HTTP POST, to a service when a resource is created or returned from a service, through an HTTP GET, when at least a resource is requested from the service.

The term "service request" refers to a signal, data, and/or computer readable instructions received by one or more computing devices (e.g., client devices, servers, etc.), seeking to access resources associated with a service provided by a corresponding computing device. An example of a service request may be a request to retrieve and render an interface within an application. The service request may be received via a user interface, communication interface, the like, or combinations thereof. In some embodiments, a service request is transmitted, by the computing device on which the service request is generated and via one or more computer networks, to another computing device configured to process the service request. The service request may be generated by one or more computer program instructions. A given service of the plurality of services within the federated system may check whether the requesting entity associated with the service request has the requisite permissions associated with the resources the entity wishes to access.

The term "resource" refers to an environment or component within an application or service as part of a federated system containing data items, object items, features, the like, or combinations thereof. Each resource may be associated with predefined permissions, which a requesting entity identifier is required to have to access the resource. Furthermore, there may be a dependency relationship among a plurality of resources with regard to permissions, whereby access to a given resource may first require permissions to access one or more other resources.

The term "context identifier" refers to one or more data items or elements by which a context associated with a service request or a requesting entity identifier may be uniquely identified. For example, the context identifier for a service request context may include a resource identifier, a resource name, the like, or combinations thereof.

The term "service request context" refers to data that represents at least one parameter of a service request. A service request context may include resources associated with a service request. For example, a context associated with a request to access a page within a given space in an application, would include the given page and given space in the request.

The term "access" refers to the ability to receive, retrieve, make available, make use of, or the like of a feature or data associated with a service within a federated system.

The term "access level" refers to one or more data items representative of the level of access associated with a requesting entity identifier.

The term "access type" refers to one or more data items representative of the type of access associated with a requesting entity identifier.

The term "resource identifier" refers to one or more data items or elements by which a resource related to a service indicative of an owner, provider, location, source, the like, or combinations thereof may be uniquely identified. The resource identifier may include, for example, one or more of Internet Protocol (IP) addresses associated with the resource, Uniform Resource Locators (URLs) associated with a resource, numerical characters, alphabetical characters, alphanumeric codes, American Standard Code for Information Interchange (ASCII) characters, encryption keys, identification certificates, the like, or combinations thereof.

The term "permissions repository" refers to a database stored on a memory device which is accessible by one or more computing devices for retrieval and storage of one or more permissions data. The permissions repository may be configured to organize permissions data stored therein in accordance with a particular permissions data category. For example, permissions data categories may comprise one or more permissions data associated with one or more requesting entity identifiers, context identifier, resources, applications, services, network functions, APIs, geographical locations, the like, or combinations thereof. In some embodiments, the permissions repository may be stored on a server remotely accessible by a computing device or on a memory device on-board the computing device.

The term "permissions data vector" refers to a data structure including one or more data records comprising permissions data associated with a requesting entity identifier. For example, a permissions data vector may include a context identifier, requesting entity identifier, resource identifier, service identifier, permissions data, access type, access level, the like or combinations thereof. In examples, the permissions data vector may be one or more of an array or a multi-dimensional array.

The term "permissions data record" refers to a data structure within a permission data structure containing data representative of permissions data for accessing some or all functionality or data associated with a particular corresponding service, application, or the like.

The term "permissions data" refers to one or more items of data representative of service permissions associated with a requesting entity identifier.

The term "permissions data value" refers to one or more items of data representative of permissions data. A permissions data value may be a string, numerical value, or any other data type.

The term "context data value" refers to one or more items of data included in a permissions data vector or other data structure representative of a context associated with a service request or a requesting entity identifier. A context data value may be a string, numerical value, or any other data type.

The term "authorization token" refers to an object item or data item representative of service permissions associated with a requesting entity identifier. The authorization token may include one or more of permissions data, a requesting entity identifier, context identifier, issuer, resource, or the like. The authorization token may contain a list of permissions relative to one or more services and/or applications, and is capable of being transmitted, received, and/or stored in accordance with embodiments of the present disclosure. Further, where a computing device is described herein to receive an authorization token from another computing device, it will be appreciated that the authorization token may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send an authorization token to another computing device, it will be appreciated that the authorization token may be sent directly to another computing device or may be sent indirectly via one or more intermediary computing devices, such as, for example, one or more servers, relays, routers, network access points, base stations, hosts, and/or the like. The authorization token may be encrypted or encoded (for example, in JavaScript Object Notation (JSON) or the like). The authorization token may also be digitally signed (e.g., with a private key). Furthermore, the authorization token may be stored in an authorization token cache. The authorization token may be associated with an authorization token cache key.

The term "authorization token cache" refers to a configuration of storage of authorization tokens and associated data. The authorization token cache may be configured to include a hierarchy of cache levels. Each cache level may be associated with a response time for retrieving an authorization token. The authorization token cache may take the form of a computer-readable storage medium.

The term "authorization token cache key" refers to one or more data items or elements by which an authorization token stored in an authorization token cache may be uniquely identified.

The term "authorization server" refers to one or more interconnected computing devices that is configured to provide functionality relating to permissions data associated with a requesting entity identifier for access to one or more services within a federated system. The authorization server may be configured to generate an authorization token.

The term "validity expiration period" refers to a period of network time associated with an authorization token stored in an authorization token cache after which the authorization token is configured to expire and/or invalidated.

The term "expire" refers to an occurrence, whereby an authorization token stored in an authorization token cache may not be utilized by a service to determine whether to grant access to resources associated with the service.

The term "invalidation," "invalidated," or similar terms, refer to an occurrence, whereby a given authorization token stored in an authorization token cache is removed from the authorization token cache or replaced (for example, with another authorization token).

The term "refresh markup" refers to one or more data items or elements associated with an authorization token cache to block the use of the authorization token cache until the cache is refreshed.

The term "authorization token cache refresh" refers to an occurrence whereby a given authorization token associated with a given requesting entity identifier stored in an authorization token cache is replaced in the authorization token cache with a new authorization token associated with the same given requesting entity identifier.

The term "claim" refers to information (e.g., data structures) contained in or associated with an authorization token. An authorization token may include user information, resource information, permissions information, any resource alias, the like, or combinations thereof. For example, a claim may be a standard claim which contains information such as the issuer of the request and the audience. A claim may additionally or alternatively include a custom claim which contains information such as user information and resource specific information (e.g., information that a user has the permissions for a given resource).

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

Figure 1B:
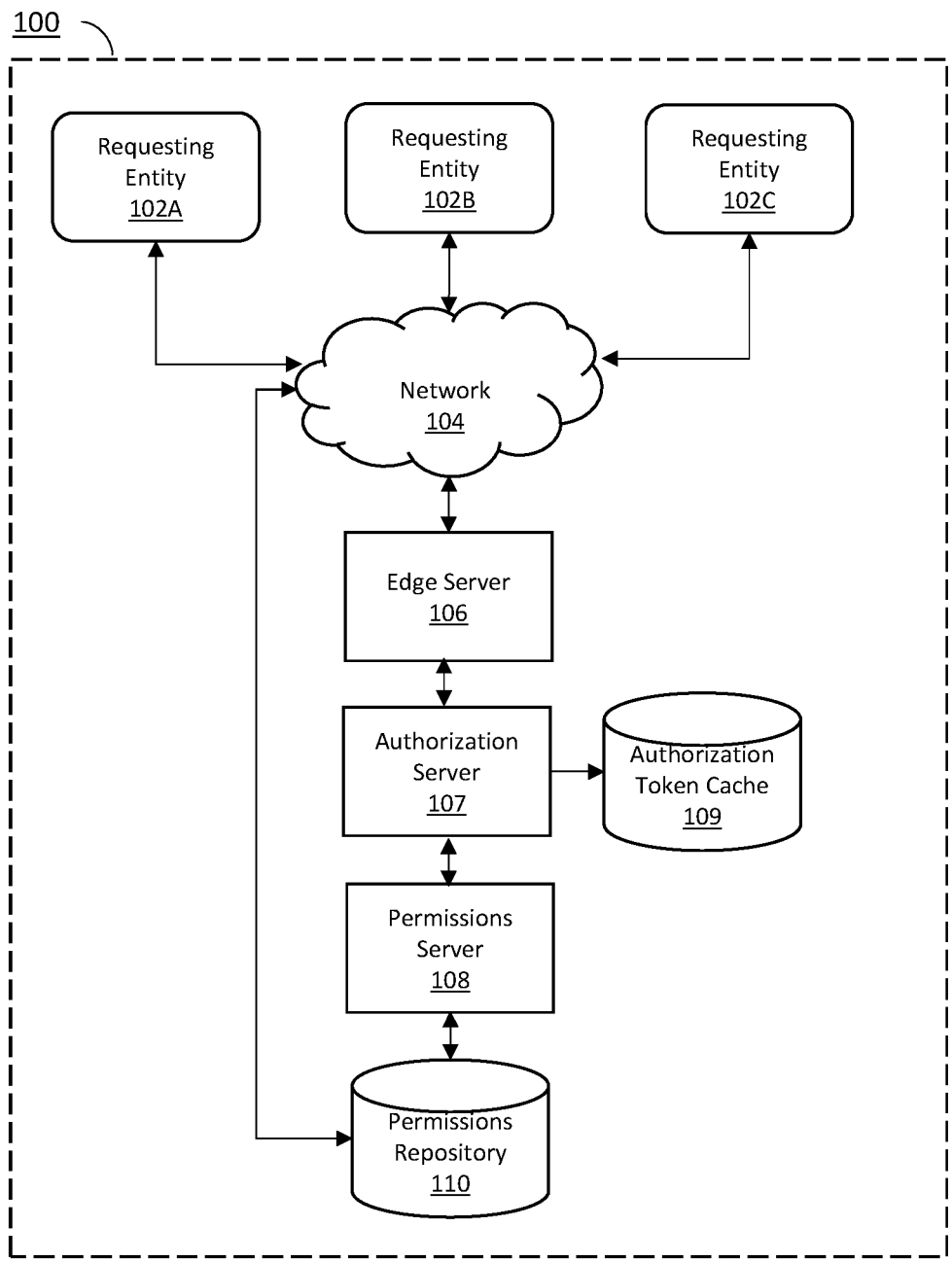
FIG. 1B is a block diagram of an example service permissions scaling system within which at least some embodiments of the present disclosure may operate.

FIG. 1A and FIG. 1B illustrate an example system architecture 100 within which embodiments of the present disclosure may operate. As shown in FIG. 1A, the architecture 100 may include a plurality of services and/or microservices each providing one or more functionality or services (e.g., processing services, database storage services, infrastructure services, or other services). A service may support, or be supported by, at least one other service via a service dependency relationship. For example, a translation application stored on a smartphone may call a translation dictionary service at a server in order to translate a particular word or phrase between two languages. In such service dependency relationships, a given service may require access to another service, or resources associated with another service. The various services within the architecture may communicate with each other via API, or the like. The various services may communicate with an edge server 106.

As shown in FIG. 1B, the architecture 100 may include an authorization server 107 configured to communicate with the edge server 106. The edge server 106 may be configured to interact with one or more requesting entities 102A-C. The requesting entity 102A-C may be a client device (e.g., client devices 114A-C), a service (e.g., services 112A-E), a computing device, a component, or the like.

In various embodiments, the authorization server 107 may be configured to receive a service request associated with a requesting entity identifier to access data and/or features associated with one or more resources associated with one or more services of a plurality of services. The service request may be initiated, for example, by the client devices 114A-C, services 112A-E, or other computing devices. The authorization server 107 may be configured to generate an authorization token configured for access by the plurality of services 112A-E based at least in part on a permissions data vector.

In some embodiments, the authorization server 107 may be configured to request a permissions data vector from a permissions server 108.

The authorization server 107 may be configured to configure the authorization token to include all permissions data associated with a given requesting entity identifier for the given context in a service request, such that the authorization token is not associated with a particular service request and may be reused to fulfill subsequent requests. The authorization server 107 may be configured to transmit the authorization token to the edge server 106. The authorization server 107 may be configured to store the authorization token in a authorization token cache 109, such that the authorization token may be retrieved by one or more services to fulfill a subsequent service request (e.g., second service request) associated with the requesting entity identifier. In some embodiments, the subsequent service request may be different from the first service request. In some embodiments, the subsequent service request may be different from the first service request but may involve the same resources. In some embodiments, the authorization server 107 may be further configured to receive a request to create or update changes to permissions data associated with a requesting entity identifier. In some embodiments, the authorization server 107 may be configured to transmit the received request to the permissions server 108 and/or other computing devices.

The edge server 106 may communicate with the requesting entities 102A-C using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JavaScript Object Notation (JSON) objects sent via a Web Socket channel. In some embodiments, the protocol is JSON over RPC, JSON over REST/HTTP, the like, or combinations thereof.

An example edge server 106 may be a proxy server, a GraphQL server, or the like. The edge server 106 may be configured to serve as a gateway to the plurality of services within the federated system and may be configured to receive service requests. The service requests may be initiated by a requesting entity (for example, a client device, a microservice, a service, or the like). The edge server 106 may be configured to transmit the service request to one or more computing devices associated with a service within the federated system. The edge server 106 may be configured to transmit the service request to the authorization server 107. The edge server 106 may be further configured to receive an authorization token from the authorization server 107 and transmit the authorization token to one or more services associated with the service request. In some embodiments, the edge server 106 may be configured to transmit the service request along with the authorization token to the one or more services associated with the service request.

The permissions server 108 may store at least permissions data representing predefined permissions for a given requesting entity identifier representative of types of access within a given service of a plurality of services a requesting entity identifier may be associated with. The permissions server 108 may store the permissions data in the structural form of a vector or other data structure. In some embodiments, the permissions server 108 may be configured such that the authorization server 107 is the only entity that may access or communicate with the permissions server 108.

The authorization token cache 109 may be configured to store the authorization token generated by the authorization server 107. The authorization token cache 109 may be configured as an external cache system (e.g., Memcached). A validity expiration period may be associated with an authorization token stored in the authorization token cache 109, such that the authorization token may be configured to expire and/or invalidated after the validity expiration period. In some embodiments, the authorization token cache 109 may include one or more cache levels (for example, in hierarchy). In some embodiments, each cache level may be associated with a response time for retrieving an authorization token. In some embodiments, the authorization token cache 109 may be configured such that an authorization token stored therein may be invalidated (for example, in response to a permissions change associated with a requesting entity identifier). In an example embodiment, a change in permissions data may trigger an authorization token cache refresh. In some embodiments, the authorization token cache 109 may be configured such that the authorization server 107 is the only entity that may access the authorization token cache 109.

Figure 2:
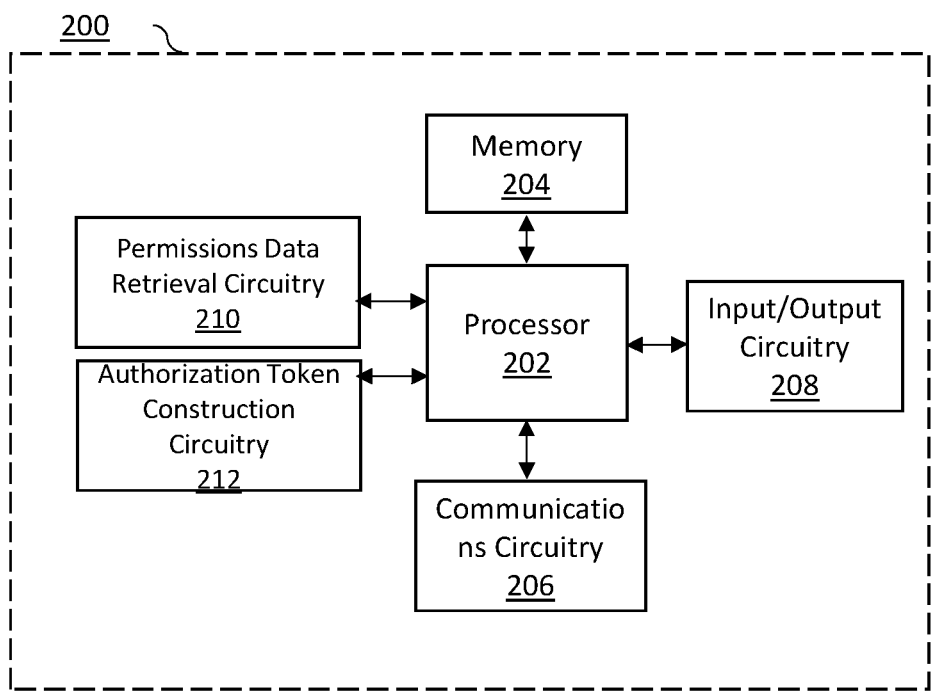
FIG. 2 is a block diagram of an example authorization service apparatus configured in accordance with at least some embodiments of the present disclosure.

The authorization server 107 may be embodied by one or more computing systems, such as apparatus 200 shown in FIG. 2. The apparatus 200 may include processor 202, memory 204, communications circuitry 206, input/output circuitry 208, permissions data retrieval circuitry 210, and authorization token construction circuitry 212. The apparatus may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The communications circuitry 206 may be any means such as a device or circuitry embodied in either hardware or combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally or alternatively, the communications circuitry 206 may include the circuitry for interacting with the antenna/antennae to cause transmission of signals via the antenna/antennae or to handle receipt of signals received via the antenna/antennae.

In some embodiments, the apparatus 200 may include input/output circuitry 208 that may, in turn, be in communication with processor 202 to provide output to the user and, in some embodiments, to receive an indication of a user input. The input/output circuitry 208 may comprise a user interface and may include a display, and may comprise a web user interface, a mobile application, a query-initiating computing device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through the computer program instructions (e.g., software and/or firmware) stored on a memory accessible to the processor (e.g., memory 204, and/or the like).

The permissions data retrieval circuitry 210 may be any means such as a device or circuitry embodied in either hardware or a combination of hardware and software that is configured to receive a service request (e.g., from the edge server 106) and determine from the service request at least a requesting entity identifier associated with the service request. In some embodiments the permissions data retrieval circuitry 210 may be configured to further determine from the service request a service identifier and/or a context identifier associated with the service request. In some embodiments, the permissions data retrieval circuitry 210 may retrieve a permissions data vector associated with the requesting entity identifier from a permissions server (e.g., permissions server 108).

In an example embodiment, the permissions data retrieval circuitry 210 may transmit and/or receive data from the permissions server 108. In some embodiments, the transmitted and/or received data may include permissions data representative of various types and/or levels of access within a given service that a requesting entity may be associated with. In examples, a given requesting entity identifier may be associated with a particular level of access to a given service, whereby the requesting entity identifier may have been granted access to certain features of the given service but not others. Further, a given requesting entity identifier may be associated with a particular level of data access within a given service, whereby the requesting entity identifier may have been granted access to certain data within the given service but not others.

In some embodiments, the received permissions data may be configured as a vector (e.g., or other data structure). In some embodiments, the permissions data vector may include a plurality of permissions data record. In some embodiments, the permissions data vector may further include a context identifier and/or a service identifier and/or a resource identifier. Furthermore, in some embodiments, each permissions data record may include a permissions data value associated with a unique service identifier of the plurality of service identifiers. In some embodiments, each permissions data record may further comprise a context data value associated with a unique service identifier of the plurality of service identifiers. In some embodiments, the permissions data retrieval circuitry 210 may retrieve the permissions data vector from the authorization token cache 109. The permissions data retrieval circuitry 210 may transmit and/or receive data and/or objects from the authorization token construction circuitry 212. In some embodiments, the permissions data retrieval circuitry 210 may be further configured to receive a request to create or update changes to permissions data associated with a requesting entity identifier and transmit the received request to the permissions server 108 and/or other computing devices.

The authorization token construction circuitry 212 may be any means such as a device or a circuitry embodied in either hardware or a combination of hardware and software that is configured to receive a permissions data vector from the permissions data retrieval circuity 210 and generate based at least on the received permissions data vector an authorization token representative of various types and/or levels of access within a given service of a plurality of services that a user may be associated with.

In some embodiments, the authorization token construction circuitry 212 may be configured to encode the authorization token (for example, in accordance with JavaScript Object Notation (JSON) standard, or the like). In some embodiments, the authorization service circuitry 212 may be further configured to associate the authorization token with a digital signature (e.g., private key) utilizing for example, an asymmetric encryption algorithm, JavaScript Object Notation (JSON) web algorithm, or the like.

In some embodiments, the authorization token construction circuitry 212 may be configured to generate the authorization token such that the authorization token is configured for access by one or more services within the federated system, whereby one or more services, may inspect the authorization token to determine whether to grant or deny access to data and/or features associated with resources associated therewith. In some embodiments, the authorization token construction circuitry 210 may be configured to transmit the authorization token to the edge server 106. In some embodiments, the authorization construction circuitry 212 may be further configured to store the authorization token in the authorization token cache 109 for access by one or more services associated with a subsequent service request associated with the requesting entity identifier irrespective of the service identifier associated with the subsequent request.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
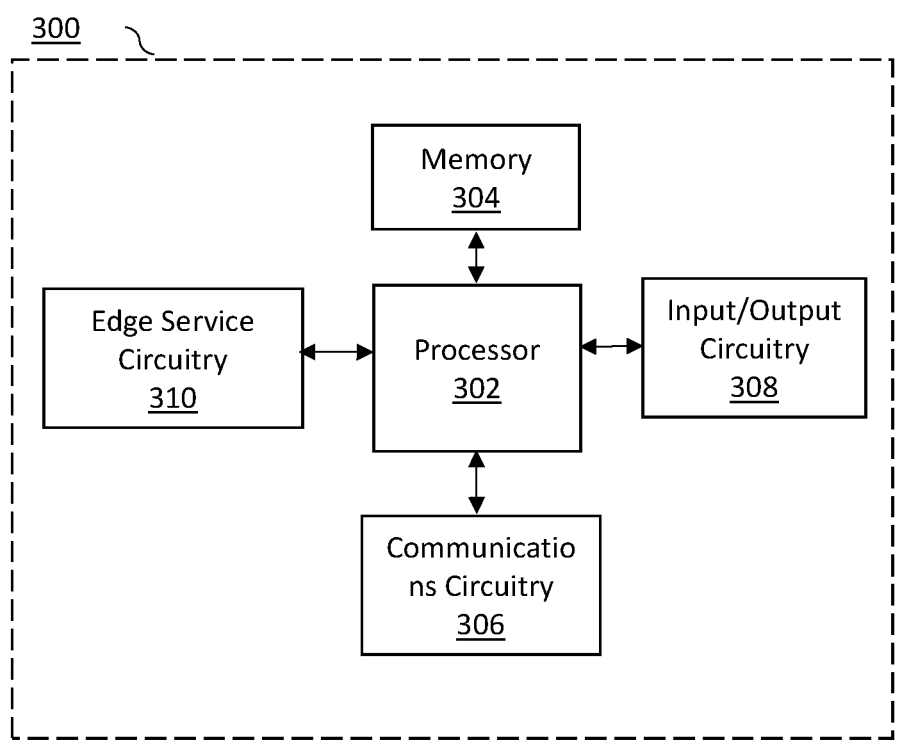
FIG. 3 is a block diagram of an example edge service apparatus configured in accordance with at least some embodiments of the present disclosure.

The edge server 106 may be embodied by one or more computing systems, such as apparatus 300 shown in FIG. 3. The apparatus 300 may include processor 302, memory 304, communications circuitry 306, input/output circuitry 308, and edge service circuitry 310. The apparatus may be configured to execute the operations described herein. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

The communications circuitry 306 may be any means such as a device or circuitry embodied in either hardware or combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communications circuitry 306 may include the circuitry for interacting with the antenna/antennae to cause transmission of signals via the antenna/antennae or to handle receipt of signals received via the antenna/antennae.

In some embodiments, the apparatus 300 may include input/output circuitry 308 that may, in turn, be in communication with processor 302 to provide output to the user and, in some embodiments, to receive an indication of a user input. The input/output circuitry 308 may comprise a user interface and may include a display, and may comprise a web user interface, a mobile application, a query-initiating computing device, a kiosk, or the like. In some embodiments, the input/output circuitry 308 may also include a keyboard, a mouse, a joystick, a touch screen, touch areas, soft keys, a microphone, a speaker, or other input/output mechanisms. The processor and/or user interface circuity comprising the processor may be configured to control one or more functions of one or more user interface elements through the computer program instructions (e.g., software and/or firmware) stored on a memory accessible to the processor (e.g., memory 304, and/or the like).

The edge service circuitry 310 may be any means such as a device or circuitry embodied in either hardware or a combination of hardware and software that is configured to receive a service request associated with a requesting entity identifier. According to various embodiments, the edge service circuitry may be configured to transmit the service request, to the authorization server 107 to request an authorization token comprising permissions data associated with the requesting entity identifier. In various embodiments, the edge service circuitry 310 may be further configured to receive an authorization token from the authorization server 107 and transmit the service request along with the authorization token to one or more computing devices associated with one or more services. Additionally, the edge service circuitry 310 may be configured to transmit a request to one or more computing devices to create permissions data for a requesting entity identifier or to update permissions data associated with a requesting entity identifier.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Figure 4:
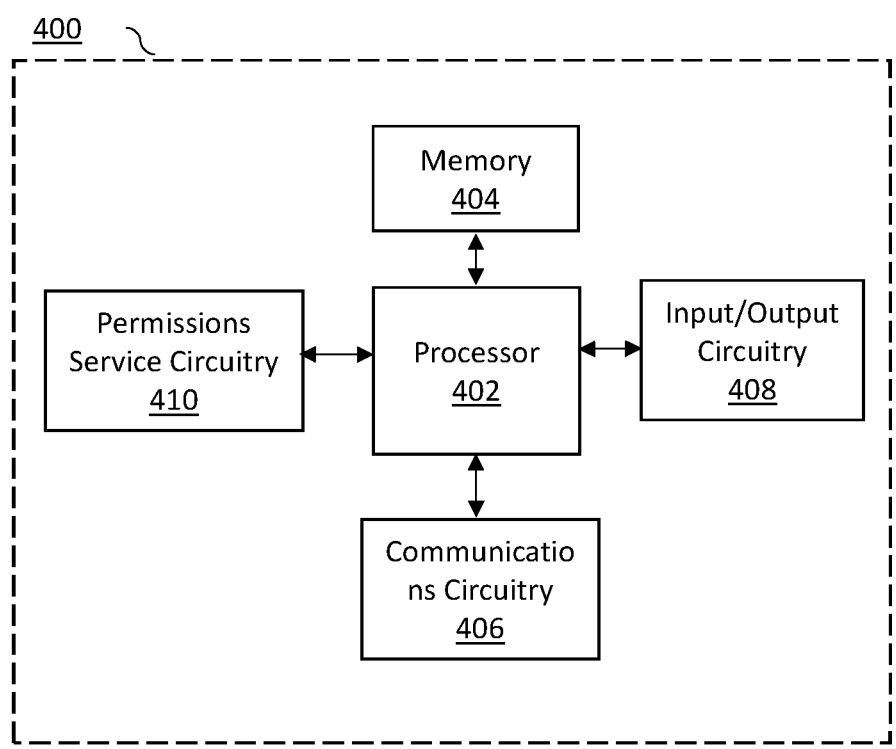
FIG. 4 is a block diagram of an example permissions service apparatus configured in accordance with at least some embodiments of the present disclosure.

The permissions server 108 may be embodied by one or more computing systems, such as apparatus 400 shown in FIG. 4. The apparatus 400 may include processor 402, memory 404, communications circuitry 406, input/output circuitry 408, and permissions service circuitry 410. The apparatus may be configured to execute the operations described herein. Although these components 402-410 are described with respect to functional limitations, it should be understood that the particular implementations necessarily include the use of particular hardware. It should also be understood that certain of these components 402-410 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present disclosure.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure the processor 402 to perform the algorithms and/or operations described herein when the instructions are executed.

The communications circuitry 406 may be any means such as a device or circuitry embodied in either hardware or combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communications circuitry 406 may include the circuitry for interacting with the antenna/antennae to cause transmission of signals via the antenna/antennae or to handle receipt of signals received via the antenna/antennae.

In some embodiments, the apparatus 400 may include input/output circuitry 408 that may, in turn, be in communication with processor 402 to provide output to the user and, in some embodiments, to receive an indication of a user input. The input/output circuitry 408 may comprise a user interface and may include a display, and may comprise a web user interface, a mobile application, a query-initiating computing device, a kiosk, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through the computer program instructions (e.g., software and/or firmware) stored on a memory accessible to the processor (e.g., memory 404, and/or the like).

The permissions service circuitry 410 may be any means such as a device or circuitry embodied in either hardware or a combination of hardware and software that is configured to receive requests for permissions data, retrieve permissions data, transmit permissions data, and create and/or update permissions data. The permissions service circuitry 410 may communicate with the permissions repository 110 to retrieve permissions data. In some embodiments, the retrieved permissions data may be in the form of a vector.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

The permissions repository 110 may be any means such as a database stored on a memory device embodied in either hardware or a combination of hardware and software that is configured to store permissions data associated with a unique requesting entity identifier for one or more requesting entity identifiers. In some embodiments, the permissions data may further be associated with a service, an application, a resource, content items, context, the like, or combinations thereof. In some embodiments, the permissions repository 110 may include one or more storage units, such as multiple distributed storage units that are connected through a computer network. Each storage unit in the permissions repository 110 may store at least one of one or more data representing permissions associated with a requesting entity identifier. Moreover, each storage unit in the permissions repository 110 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millepede memory, racetrack memory, the like, or combinations thereof. The permissions repository 110 may be configured to receive permissions updates from the various services within the federated system and/or permissions server 108.

Figure 5:
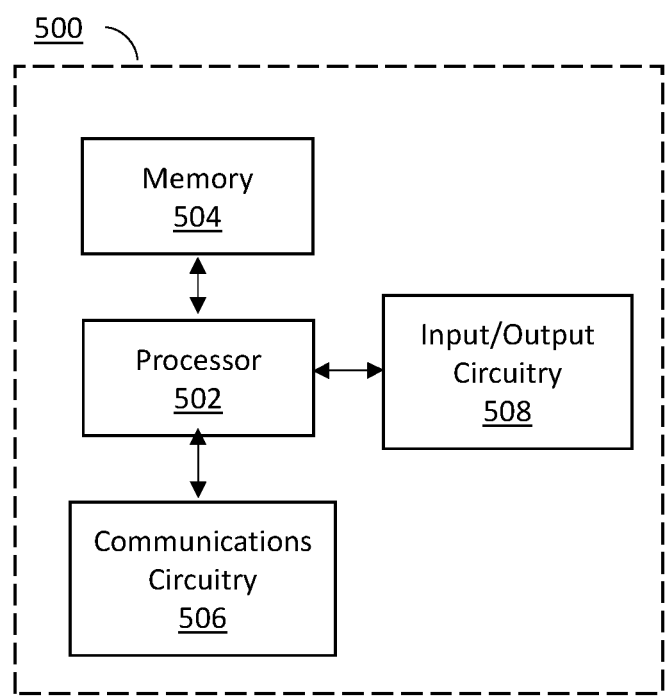
FIG. 5 is a block diagram of an example client device configured in accordance with at least some embodiments of the present disclosure.

Referring now to FIG. 5, the client device 114A-C may be embodied by one or more computing systems, such as apparatus 500. The apparatus 500 may include processor 502, memory 504, communications circuitry 506, and input/output circuitry 508. Although these components 502-508 are described with respect to functional limitations, it should be understood that the particular implementations necessarily include the use of particular hardware. It should also be understood that certain of these components 502-508 may include similar or common hardware. For example, two sets of circuitries may both leverage use of the same processor, such that duplicate hardware is not required for each set of circuitries.

In some embodiments, the processor 502 (and/or co-processor or any other processing circuitry assisting or otherwise associated with the processor) may be in communication with the memory 504 via a bus for passing information among components of the apparatus. The memory 504 is non-transitory and may include, for example, one or more volatile and/or non-volatile memories. In other words, for example, the memory 504 may be an electronic storage device (e.g., a computer-readable storage medium). The memory 504 may include one or more databases. Furthermore, the memory 504 may be configured to store information, data, content, applications, instructions, services, or the like for enabling the apparatus to carry out various functions in accordance with example embodiments of the present disclosure.

The processor 502 may be embodied in a number of different ways and may, for example, include one or more processing devices configured to perform independently. In some preferred and non-limiting embodiments, the processor 502 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 502 may be configured to execute instructions stored in the memory 504 or otherwise accessible to the processor 502. In some preferred and non-limiting embodiments, the processor 502 may be configured to execute hard-coded functionalities. As such, whether configured by hardware or software methods, or by a combination thereof, the processor 502 may represent an entity (e.g., physically embodied in circuitry) capable of performing operations according to an embodiment of the present disclosure while configured accordingly. Alternatively, as another example, when the processor 502 is embodied as an executor of software instructions (e.g., computer program instructions, etc.), the instructions may specifically configure the processor 502 to perform the algorithms and/or operations described herein when the instructions are executed.

The communications circuitry 506 may be any means such as a device or circuitry embodied in either hardware or combination of hardware and software that is configured to receive and/or transmit data from/to a network and/or any other device, circuitry, or module in communication with the apparatus 500. In this regard, the communications circuitry 506 may include, for example, a network interface for enabling communications with a wired or wireless communication network. For example, the communications circuitry 506 may include one or more network interface cards, antennae, buses, switches, routers, modems, and supporting hardware and/or software, or any other device suitable for enabling communications via a network. Additionally or alternatively, the communications circuitry 506 may include the circuitry for interacting with the antenna/antennae to cause transmission of signals via the antenna/antennae or to handle receipt of signals received via the antenna/antennae.

In some embodiments, the apparatus 500 may include input/output circuitry 508 that may, in turn, be in communication with processor 502 to provide output to the user and, in some embodiments, to receive an indication of a user input. The input/output circuitry 508 may comprise a user interface and may include a display, and may comprise a web user interface, a mobile application, a query-initiating computing device, a kiosk, or the like. In some embodiments, the input/output circuitry 508 may also include a keyboard (e.g., also referred to herein as keypad), a mouse, a joystick, a touch screen, touch areas, soft keys, a microphone, a speaker, or other input/output mechanisms. The processor and/or user interface circuity comprising the processor may be configured to control one or more functions of one or more user interface elements through the computer program instructions (e.g., software and/or firmware) stored on a memory accessible to the processor (e.g., memory 504, and/or the like).

It is also noted that all or some of the information discussed herein can be based on data that is received, generated and/or maintained by one or more components of apparatus 500. In some embodiments, one or more external systems (such as a remote cloud computing and/or data storage system) may also be leveraged to provide at least some of the functionality discussed herein.

Figure 6:
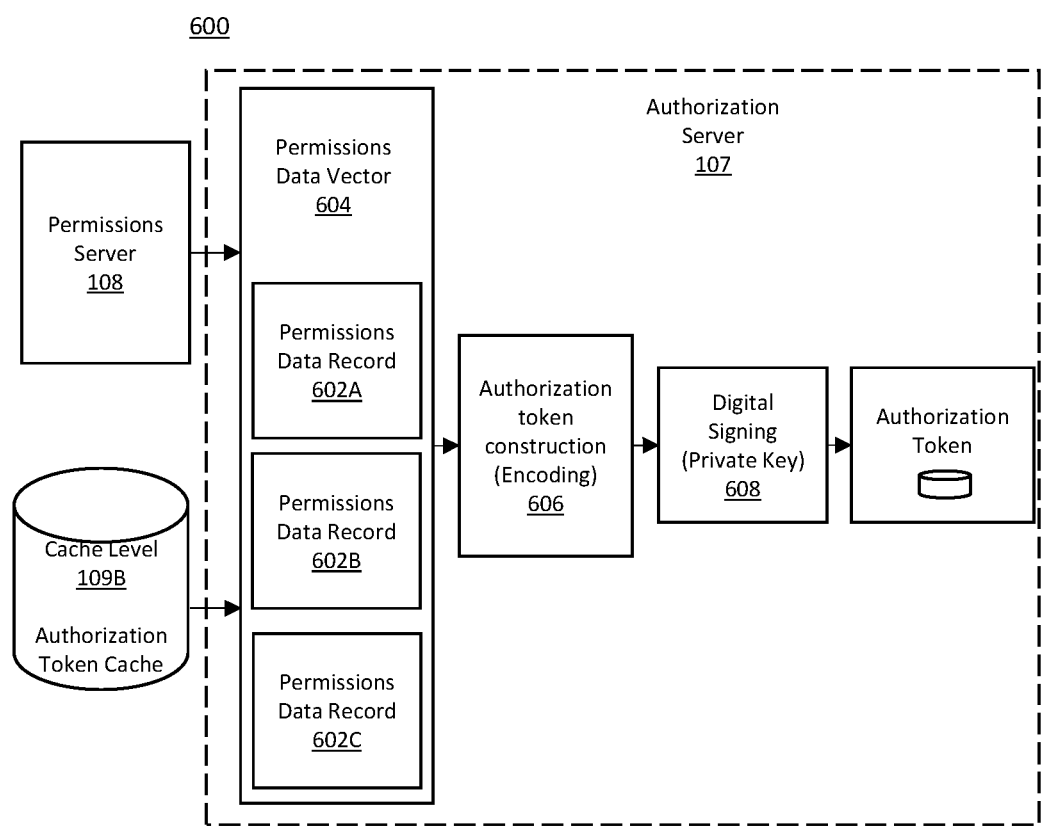
FIG. 6 is a flowchart diagram of an example authorization token generation flow in accordance with at least some embodiments of the present disclosure.

FIG. 6 illustrates an exemplary authorization token generation flow 600. Permissions data vector 604 received from the permissions server 108 and/or authorization token cache level 109B (discussed below) may comprise permissions data records 602A-C. The authorization server 107 takes as input the permissions data vector 604 and generates an authorization token based at least in part on the permissions data vector 604. In some examples, the authorization server 107 may encode the authorization token (e.g., utilizing JavaScript Object Notation standard, or the like). In some examples, the authorization server 107 may associate the authorization token with a digital signature, (e.g., private key), utilizing for example, an asymmetric encryption algorithm, JavaScript Object Notation web algorithm, or the like.

In some embodiments, an example structure of an authorization token may include claims. In some embodiments, the claims may include standard claims. An example standard claim associated with an authorization token may include service information such as the issuer of the service request and the audience (e.g., application). In some embodiments, the claims may include custom claims (e.g., in the form of a string or other data structure). An example custom claim associated with an authorization token may include user information, resource information, and/or permissions information, whereby indicating that the user has the requisite permissions to the given resources.

Figure 7A:
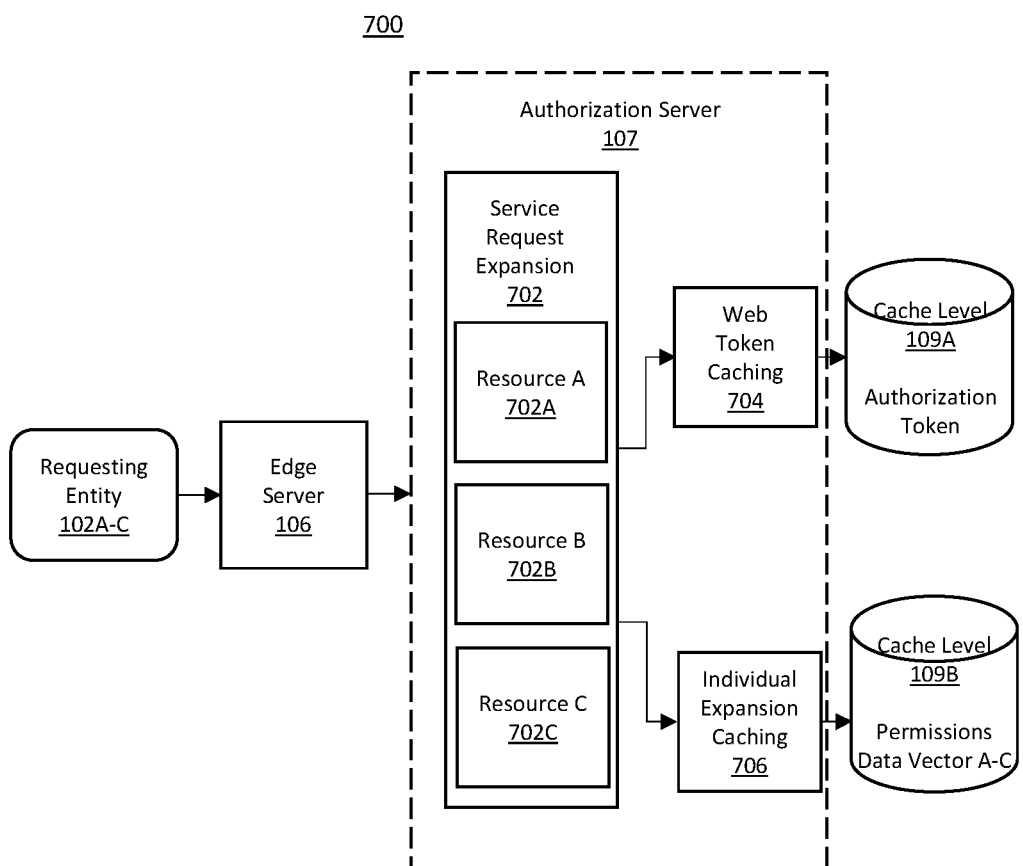
FIG. 7A is a flowchart diagram of an example authorization token caching flow in accordance with at least some embodiments of the present disclosure.

Referring now to FIG. 7A, an exemplary authorization token caching flow 700 is presented. In examples, various services may be containerized, whereby resources are in hierarchy such that each resource is associated with a particular level of access. In such examples, permissions check may be required at multi-levels to fulfill a service request. In some embodiments, as depicted at 702, the authorization server 107 may be configured to expand a service request upon receiving the service request into the individual resources associated with the service request.

In some embodiments, the authorization token cache 109 may include one or more cache levels. As shown in FIG. 7A, the authorization token cache 109 may include a cache level 109A and a cache level 109B. In some embodiments, the cache level 109A and the cache level 109B may be configured in hierarchy. For example, cache level 109A may be associated with a first level and cache level 109B may be associated with a second level, whereby the first level is higher in hierarchy relative to the second level. In some embodiments, the authorization server 107 may be configured, in response to a service request, to source an authorization token first from the cache level 109A associated with first level.

In some embodiments, the cache level 109A may be configured, such that a validity expiration period may be associated with an authorization token stored therein. In some embodiments, the cache level 109B may be configured, such that a validity expiration period may be associated with an authorization token stored therein. In some embodiments the cache level 109A and the cache level 109B may be configured, such that the validity expiration period associated with the cache level 109A may be shorter than the validity expiration period associated with the cache level 109B. An example validity expiration period may be 1 minute or other suitable duration.

In some embodiments, as depicted at 704, the authorization server 107 may store, in the cache level 109A, the authorization token as a JavaScript Object Notation web token or the like. In some embodiments, as depicted at 706, the authorization server 107, additionally or alternatively, for each resource associated with the service request may store in the cache level 109B the corresponding permissions data vector.

In some embodiments an authorization token stored in the cache level 109A and/or the cache level 109B may be associated with a unique authorization token cache key. In some embodiments, the cache level 109A may be configured such that an authorization token stored therein may be invalidated (for example, in response to a change in permissions data associated with the authorization token). In an example embodiment, the cache level 109A may be configured such that data may be written into the cache level 109A to invalidate an authorization token stored therein. In some embodiments, the cache level 109B may be configured such that an authorization token stored therein may be invalidated (for example, in response to a change in permissions data associated with the authorization token). In an example embodiment, the cache level 109B may be configured such that data may be written into the cache level 109B to invalidate an authorization token stored therein.

In some embodiments, the authorization server 107 may be configured to invalidate an authorization token stored in cache level 109A and/or cache level 109B in response to certain occurrences (e.g., a content hierarchy change). In some embodiments, the authorization server 107 may be configured to create a refresh markup associated with the cache level 109A in response to certain occurrences (e.g., a content hierarchy change, a change in permissions data associated with a resource, or the like), whereby for a period of time a service may not utilize an authorization token stored in the cache level 109A to determine whether to grant access to resources associated with the service. In some embodiments, the refresh markup may be associated with the validity expiration period associated with the cache level 109A, such that a service may not utilize an authorization token stored in the cache level 109A until after the validity expiration period. In some embodiments, the cache may be eagerly refreshed.

In some embodiments, the authorization server 107 may be configured to create a refresh markup associated with the cache level 109B in response to certain occurrences (e.g., content hierarchy change, change in permissions associated with a resource, or the like), whereby for a period of time a service may not utilize an authorization token stored in the cache level 109B to determine whether to grant access to resources therewith. In some embodiments, the refresh markup may be associated with the validity expiration period associated with the cache level 109B, such that a service may not utilize an authorization token stored in the cache level 109B until after the validity expiration period. In some embodiments, the cache may be eagerly refreshed.

Figure 7B:
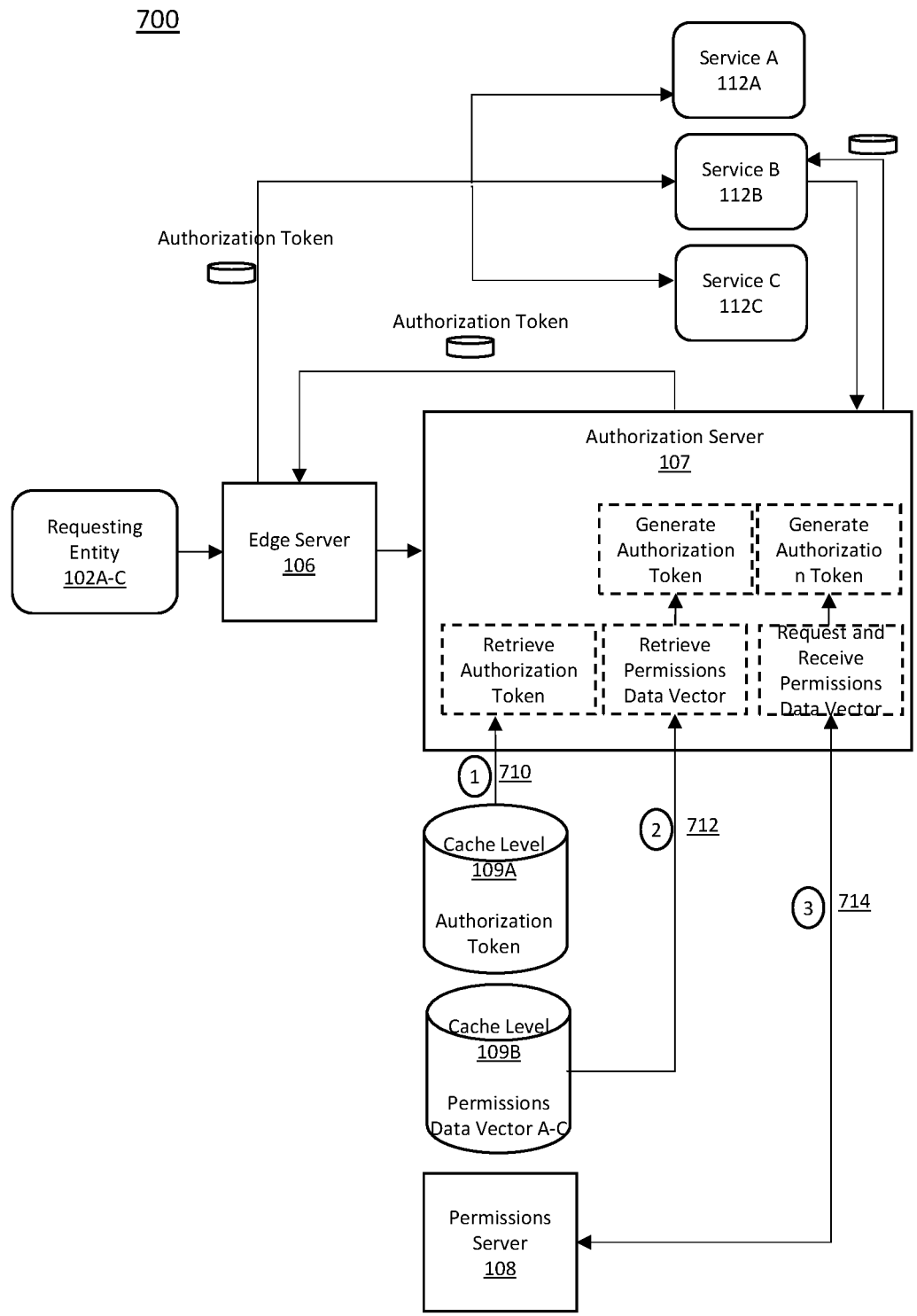
FIG. 7B is a flowchart diagram of an example authorization token retrieval flow in accordance with at least some embodiments of the present disclosure.

Referring now to FIG. 7B, upon receiving a service request (e.g., a subsequent service request), the authorization server 107 may be configured to first source 710 from the authorization token cache level 109A an authorization token associated with the requesting entity identifier and context in the request. The authorization server 107 may retrieve the relevant authorization token (e.g., with matching context) from the cache level 109A and transmit the authorization token to the edge server 106. The edge server 106 may transmit the authorization token to the services associated with the service request. The authorization server 107 may be further configured to retrieve a permissions data vector from the authorization cache level 109B. In an example embodiment, where the context of a subsequent request may not match the context of the initial request from which an authorization token was generated/based, the authorization server may be configured to source 712 from the authorization token cache level 109B, permissions data vector associated with one or more resources associated with the subsequent service request.

For example, the authorization token cache level 109B may include permissions data vector for one or more of the resources associated with the subsequent service request. In such example embodiment, the authorization server 107 may retrieve from the cache level 109B, the relevant (e.g., matching) permissions data vector and generate a new authorization token based at least in part on the retrieved permissions data vector. The authorization server 107 may be configured to store the new authorization token in the authorization token cache 109. The authorization server 107 may transmit the new authorization token to the edge server 106. The edge server 106 may transmit the authorization token to the services associated with the service request.

Additionally, or alternatively, the authorization server 107 may request and receive 714 a permissions data vector from the permissions server 108. The authorization server 107 may generate a new authorization token based at least in part on the received permissions data vector and transmit the new authorization token to the edge server 106. The authorization server 107 may be configured to store the new authorization token in the authorization token cache level 109A and/or the authorization token cache level 109B. The edge server 106 may transmit the authorization token to the services associated with the service request. In some examples, a given service may request an authorization token from the authorization server 107 (for example, where the authorization token received from the edge serve does not include the permissions information for one or more resources associates with the a service request).

Figure 8:
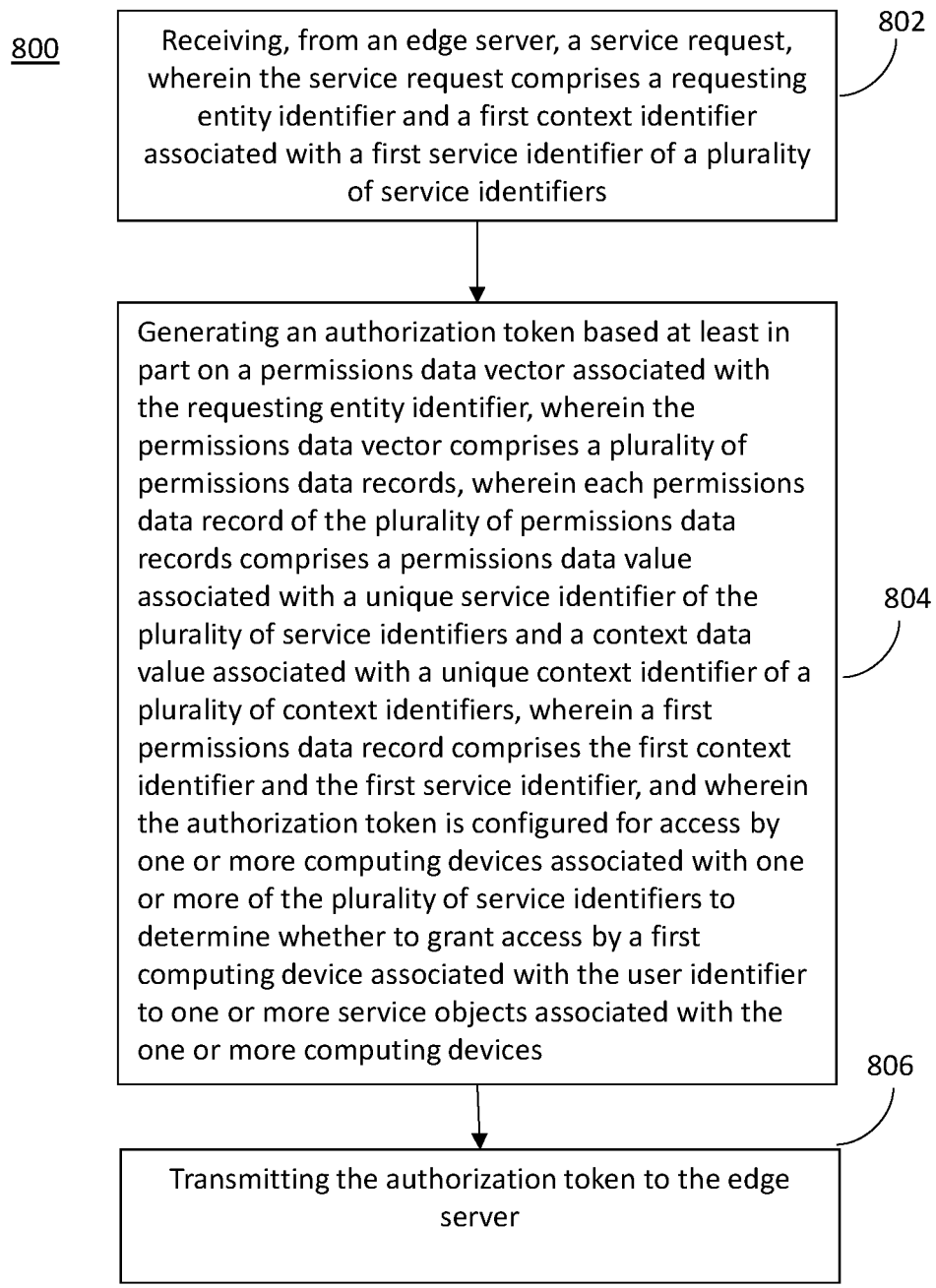
FIG. 8 is a flowchart diagram of an example service permissions scaling system in accordance with at least some embodiments of the present disclosure.

FIG. 8 is a flowchart diagram of an example process 800, for service permissions scaling. In embodiments, the process begins when the authorization server 107 receives 802, from an edge server 106 (e.g., proxy server, GraphQL server, or the like), a service request. The service request may comprise a requesting entity identifier and a first context identifier associated with a first service identifier of a plurality of service identifiers.

In some examples, a given requesting entity identifier may be associated with a particular level of access to a given service, whereby the requesting entity identifier may have been granted access to certain features of the given service but not others. In some examples, a given requesting entity identifier may be associated with a particular level of data access within a given service, whereby the requesting entity identifier may have been granted access to certain data within the given service but not others. In some examples, the context identifier may include, but not limited to, a resource identifier. In some examples, the request may originate from the first computing device associated with the requesting entity identifier. In some examples, the service request may originate from a client device, a service, a microservice, an application, or the like. In some examples, the service request may include a request to access one or more data and/or feature associated with a resource associated with a service.

In embodiments, the authorization server 107 generates 804 an authorization token based at least in part on a permissions data vector associated with the requesting entity identifier. The permissions data vector comprises a plurality of permissions data records. Each permissions data record of the plurality of permissions data records comprises a permissions data value associated with a unique service identifier of the plurality of service identifiers and a context data value associated with a unique context identifier of a plurality of context identifiers. In this manner, a first permissions data record comprises the first context identifier and the first service identifier.

In embodiments, the authorization server 107 configures the authorization token for access by one or more computing devices associated with one or more of the plurality of service identifiers. The one or more computing devices utilize the authorization token to determine whether to grant access by a first computing device associated with the requesting entity identifier to one or more resources associated with the one or more computing devices.

In some examples, the authorization server 107 may transmit to a permissions provider such as the permissions server 108 a request for a permissions data vector. In some examples, the authorization server 107 may receive from the permissions server 108, the permissions data vector associated with the requesting entity identifier. In some examples, additionally or alternatively, the authorization server may retrieve from the authorization token cache level 109B a permissions data vector associated with the requesting entity identifier.

In some examples, the authorization server 107 may encode the authorization token (for example, in accordance with JavaScript Object Notation (JSON) standard). In some examples, the authorization server 107 may associate the authorization token with a digital signature (e.g., private key) utilizing, for example an asymmetric encryption algorithm, JavaScript Object Notation (JSON) web algorithm, or the like. As shown at operation 810, the authorization server 107 transmits the authorization token to the edge server 106.

Figure 9:
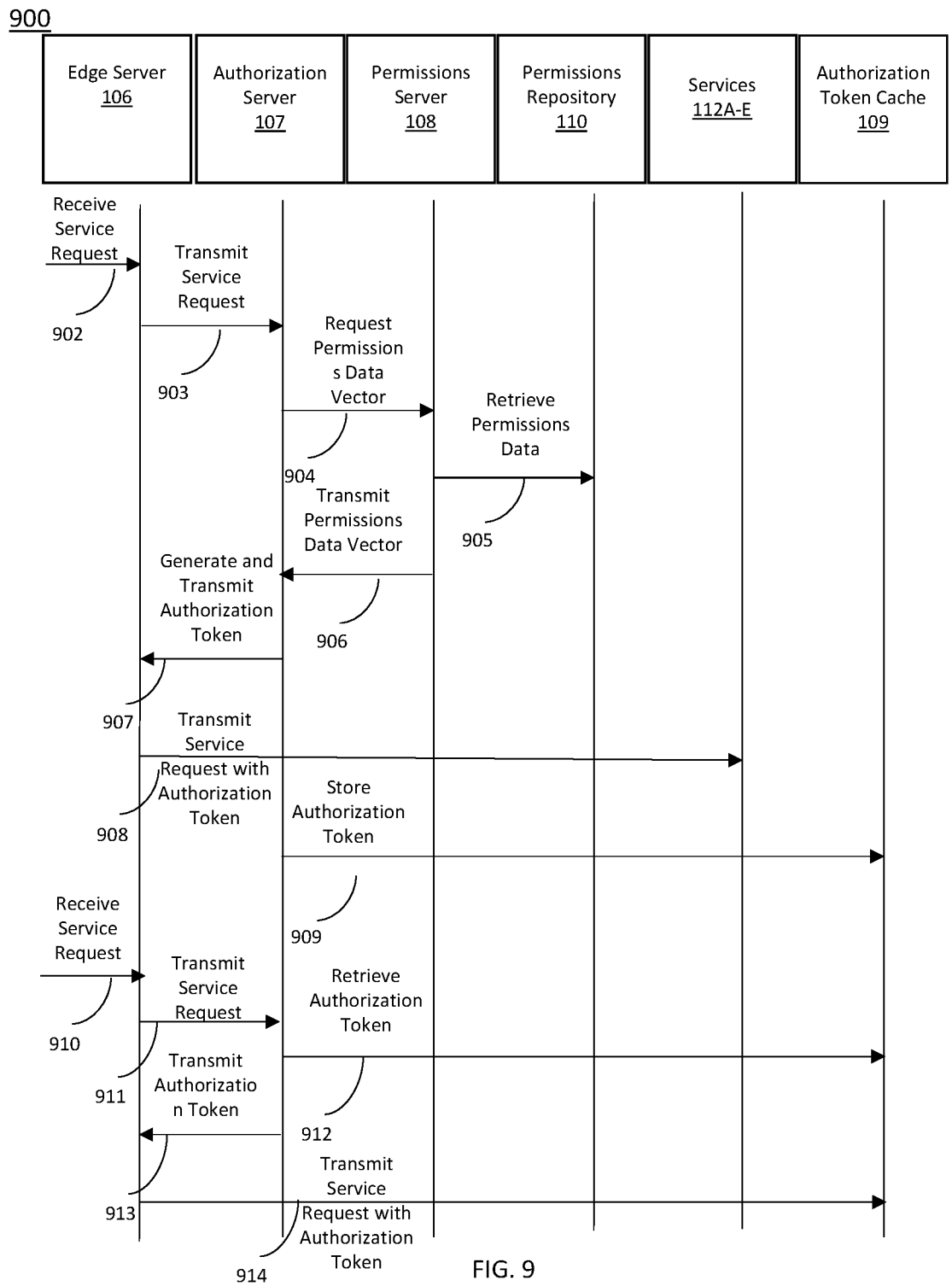
FIG. 9 is a signal diagram of an example service permissions scaling system in accordance with at least some embodiments of the present disclosure.

FIG. 9 is a signal diagram of an example service permissions scaling system in accordance with at least some embodiments of the present disclosure. In embodiments, the edge server 106 receives 902 a service request associated with a requesting entity identifier. The edge server 106 transmits 903 the service request to the authorization server 107. The authorization server 107 requests 904 permissions data vector from the permissions server 108. The permissions server 108 retrieves 905 permissions data from the permissions repository 110. The permissions server 108 transmits 906 a permissions data vector to the authorization server 107. The authorization server generates 907 an authorization token associated with the requesting entity identifier based at least in part on the permissions data vector received from the permissions server 108 and transmits the authorization token to the edge server 106. The edge server 106 transmits 908 the service request along with the authorization token to one or more services 112A-E. In some embodiments, the permissions repository 110 may be updated by one or more of the services 112A-E and/or the permissions server 108.

In embodiments, the authorization server 107 stores 909 the authorization token in the authorization token cache 109. In some embodiments, the edge server 106 may receive 910 a subsequent service request associated with the requesting entity identifier. The edge server 106 transmits 911 the service request to the authorization server 107. The authorization server 107 retrieves 912 from the authorization token cache 109, an authorization token associated with the requesting entity identifier. The authorization server 106 transmits 913 the authorization to the edge server 106. The edge server 106 transmits 914 the service request along with the authorization token to one or more services. In some examples, the authorization server 107 may retrieve from the authorization token cache 109, permissions data vector for one or more resources associated with the subsequent service request and generate a new authorization token.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

Various embodiments of the present disclosure are set forth below, in review of, and/or supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for service permissions scaling in a federated system, the apparatus comprising at least one processor and at least one memory including program code that with the processor, cause the apparatus to:
   receive, from an edge server, a service request, wherein the service request comprises a requesting entity identifier and a first context identifier associated with a first service identifier of a plurality of service identifiers, wherein the first service identifier is associated with a first service of a plurality of services;
   generate an authorization token based at least in part on a permissions data vector associated with the requesting entity identifier, wherein the permissions data vector comprises a plurality of permissions data records, wherein the plurality of permissions data records comprise permissions data associated with the requesting entity identifier for each of the plurality of services, wherein each permissions data record of the plurality of permissions data records comprises a permissions data value associated with a unique service identifier of the plurality of service identifiers and a context data value associated with a unique context identifier of a plurality of context identifiers, wherein a first permissions data record comprises the first context identifier and the first service identifier, and wherein the authorization token is configured for access by one or more computing devices associated with one or more of the plurality of service identifiers to determine whether to grant access by a first computing device associated with the requesting entity identifier to one or more resources associated with the one or more computing devices; and
   transmit the authorization token to the edge server.

2. The apparatus according to claim 1, wherein the at least one memory including program code that with the processor, further causes the apparatus to:
   transmit, to a permissions server, a request for the permissions data vector.

3. The apparatus according to claim 2, wherein the at least one memory including program code that with the processor, further causes the apparatus to:
   receive, from the permissions server, the permissions data vector.

4. The apparatus according to claim 1, wherein the service request comprises a request to access one or more of a feature or data associated with a resource associated with the first service identifier.

5. The apparatus according to claim 1, wherein the service request originates from the first computing device associated with the requesting entity identifier.

6. The apparatus according to claim 1, wherein the first context identifier comprises a resource identifier.

7. The apparatus according to claim 1, wherein the at least one memory including program code that with the processor, further causes the apparatus to:
   store the authorization token in an authorization token cache.

8. The apparatus according to claim 7, wherein the authorization token is configured to expire after a validity expiration period.

9. The apparatus according to claim 7, wherein the authorization token is configured for invalidation in response to a change in the permissions data vector.

10. A computer-implemented method for service permissions scaling in a federated system, the method comprising:
    receiving, from an edge server, a service request, wherein the service request comprises a requesting entity identifier and a first context identifier associated with a first service identifier of a plurality of service identifiers, wherein the first service identifier is associated with a first service of a plurality of services;
    generating an authorization token based at least in part on a permissions data vector associated with the requesting entity identifier, wherein the permissions data vector comprises a plurality of permissions data records, wherein the plurality of permissions data records comprise permissions data associated with the requesting entity identifier for each of the plurality of services, wherein each permissions data record of the plurality of permissions data records comprises a permissions data value associated with a unique service identifier of the plurality of service identifiers and a context data value associated with a unique context identifier of a plurality of context identifiers, wherein a first permissions data record comprises the first context identifier and the first service identifier, and wherein the authorization token is configured for access by one or more computing devices associated with one or more of the plurality of service identifiers to determine whether to grant access by a first computing device associated with the requesting entity identifier to one or more resources associated with the one or more computing devices; and
    transmitting the authorization token to the edge server.

11. The computer-implemented method according to claim 10, further comprising:
    transmitting, to a permissions server, a request for the permissions data vector.

12. The computer-implemented method according to claim 11, further comprising:
    receiving, from the permissions server, the permissions data vector.

13. The computer-implemented method according to claim 10, wherein the service request comprises a request to access one or more of a feature or data associated with a resource associated with the first service identifier.

14. The computer-implemented method according to claim 10, wherein the service request originates from the first computing device associated with the requesting entity identifier.

15. The computer-implemented method according to claim 10, wherein the first context identifier comprises a resource identifier.

16. The computer-implemented method according to claim 10, further comprising:
storing the authorization token in an authorization token cache.

17. The computer-implemented method according to claim 16, wherein the authorization token is configured to expire after a validity expiration period.

18. The computer-implemented method according to claim 16, wherein the authorization token is configured for invalidation in response to a change in the permissions data vector.

19. A non-transitory computer readable storage medium comprising instructions for service permissions scaling in a federated system, when executed by a processor, cause an apparatus comprising at least one processor and at least one memory to:
receive, from an edge server, a service request, wherein the service request comprises a requesting entity identifier and a first context identifier associated with a first service identifier of a plurality of service identifiers, wherein the first service identifier is associated with a first service of a plurality of services;
generate an authorization token based at least in part on a permissions data vector, associated with the requesting entity identifier, wherein the permissions data vector comprises a plurality of permissions data records, wherein the plurality of permissions data records comprise permissions data associated with the requesting entity identifier for each of the plurality of services, wherein each permissions data record of the plurality of permissions data records comprises a permissions data value associated with a unique service identifier of the plurality of service identifiers and a context data value associated with a unique context identifier of a plurality of context identifiers, wherein a first permissions data record comprises the first context identifier and the first service identifier, and wherein the authorization token is configured for access by one or more computing devices associated with one or more of the plurality of service identifiers to determine whether to grant access by a first computing device associated with the requesting entity identifier to one or more resources associated with the one or more computing devices; and
transmit the authorization token to the edge server.

20. The non-transitory computer readable storage medium according to claim 19, when executed by the processor, further causes the apparatus comprising at least one processor and at least one memory to:
transmit, to a permissions server, a request for the permissions data vector.

21. The non-transitory computer readable storage medium according to claim 20, when executed by the processor, further causes the apparatus comprising at least one processor and at least one memory to:
receive, from the permissions server, the permissions data vector.

22. The non-transitory computer readable storage medium according to claim 19, wherein the service request comprises a request to access one or more feature or data associated with a resource associated with the first service identifier.

23. The non-transitory computer readable storage medium according to claim 19, wherein the service request originates from the first computing device associated with the requesting entity identifier.

24. The non-transitory computer readable storage medium according to claim 19, wherein the first context identifier comprises a resource identifier.

25. The non-transitory computer readable storage medium according to claim 19, when executed by the processor, further causes the apparatus comprising at least one processor and at least one memory to:
store the authorization token in an authorization token cache.

26. The non-transitory computer readable storage medium according to claim 25, wherein the authorization token is configured to expire after a validity expiration period.

27. The non-transitory computer readable storage medium according to claim 25, wherein the authorization token is configured for invalidation in response to a change in the permissions data vector.

28. The non-transitory computer readable storage medium according to claim 25, when executed by the processor, further causes the apparatus comprising at least one processor and at least one memory to:
receive, from the edge server, a second service request, the second service request comprising the requesting entity identifier;
retrieve, from the authorization token cache, the authorization token associated with the requesting entity identifier; and
transmit the authorization token to the edge server.

* * * * *